Feb. 28, 1939.  H. KOHL  2,149,057
FRICTION GEARING
Filed Nov. 2, 1937  2 Sheets-Sheet 1
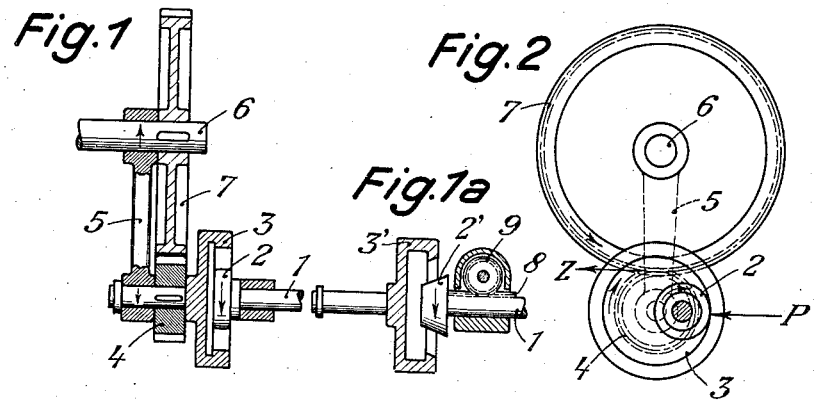
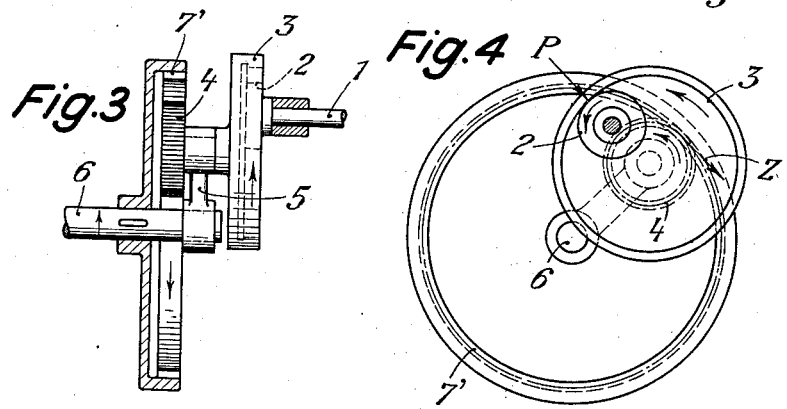
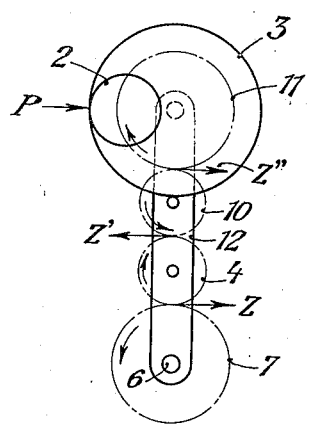
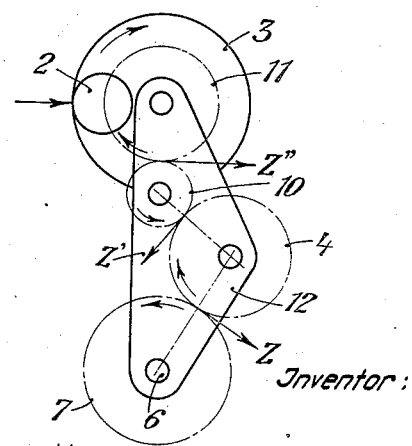
Inventor:
Hermann Köhl
By Young, Emery & Thompson
Attorneys Feb. 28, 1939.  H. KOHL  2,149,057
FRICTION GEARING
Filed Nov. 2, 1937   2 Sheets-Sheet 2
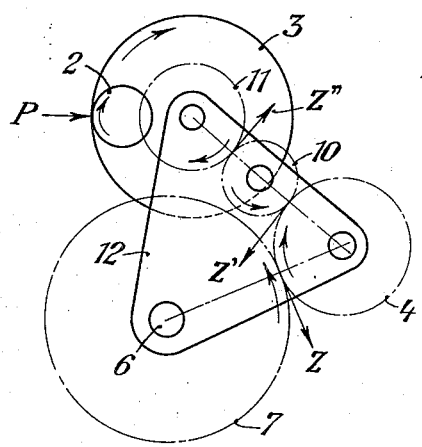
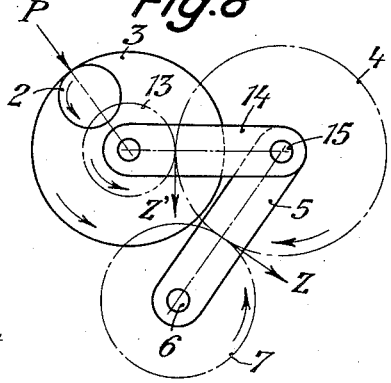
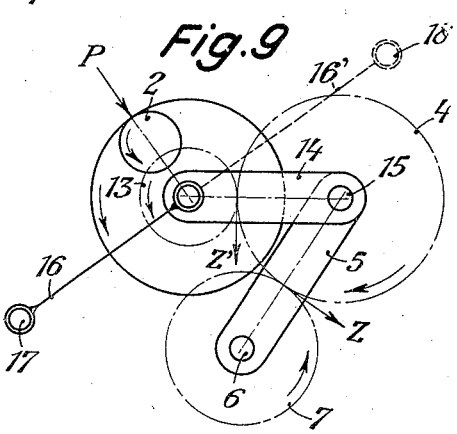
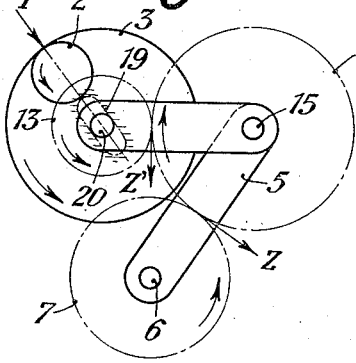
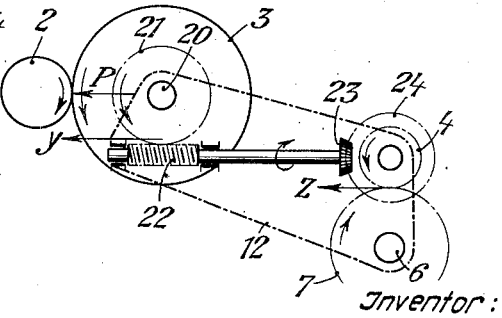
Inventor:
Hermann Kohl
By
Young, Emery & Thompson
Attorneys

Patented Feb. 28, 1939

2,149,057

UNITED STATES PATENT OFFICE

2,149,057

FRICTION GEARING

Hermann Köhl, Stolberg, Germany, assignor, by mesne assignments, to P K Drive Corp., Jersey City, N. J., a corporation of New Jersey Application November 2, 1937, Serial No. 172,454
In Germany November 10, 1936

6 Claims. (Cl. 74—208)

In applicant's copending application, Serial No. 68,334, filed March 11, 1936, there is described a friction gearing in which the driven friction wheel drives on a pinion which is mounted on a rocker arm and swings freely about the axle of a sun wheel and meshes in its toothed crown, in which case, owing to the back-pressure of the two gears the coupling pressure between the two friction wheels is produced. It has been found that no elastic or flexible members must be used in the transmission mechanism if a satisfactory operation of the mechanism and a strong coupling pressure between the friction wheels is to be obtained. In said application, the essence of the invention was therefore seen in the fact that the driven friction wheel is arranged on the axle of the pinion swinging freely about the axle of the sun gear.

This arrangement represents only one definite form of construction. As exhaustive tests have shown, the same effect can be obtained generally also when the driven friction wheel is coupled with the axle of the pinion swinging freely about the axle of the sun wheel by rigid connections, for example by means of toothed gears, helical gears or worm gears. In gears of this type a definite rule can be given for the arrangement of the wheels and for the direction of rotation of the gearing which is decisive when an increased coupling pressure and therefore good operation of the gearing is to be obtained.

For further explanation of the subject matter of the invention attention is directed to the accompanying drawings showing partially known and partially new forms of construction.

Figure 1 is an axial sectional view of a gearing according to applicant's copending application, Serial No. 68,334, Fig. 1a is a similar view of a modified construction of the frictional unit, Fig. 2 is an end view of the gearing of Fig. 1, Fig. 3 is an axial sectional view of a modified form, Fig. 4 is an end view of the gearing of Fig. 3, and Figs. 5 to 11 are diagrammatic views showing a number of modified constructions of the gearing according to the invention.

In the gearing according to Fig. 1 the drive takes place from the shaft 1 which drives a friction disc 2 in the direction indicated by an arrow. The driven friction disc 3 is connected firmly with a pinion 4 which is guided by a rocker arm 5 and meshes with the teeth of the sun gear 7 mounted on the driven shaft 6. Fig. 1 shows a single-stage gearing. If the friction wheel 2 is replaced by a conical friction disc 2' and the driven disc 3' is shaped accordingly, an infinitely variable friction wheel gearing is obtained in which, by axial displacement of the driving shaft 1, for example, by means of the rack 8 and the gear 9, different transmission speeds can be transmitted from the driving shaft 1 running in the same direction, to the driven shaft 6.

Fig. 2 shows a diagrammatic side view of Fig. 1 from which can be seen particularly the directions of rotation to be chosen, so that there is obtained on the rocker arm 5 a back-pressure Z between the gears 4 and 7 which is transmitted as coupling pressure P to the position of contact between the driving friction disc 2 and the driven friction disc 3. Figs. 3 and 4 show in principle the same gearing, except that the pinion 4 which in accordance with the earlier patent is located on the same axis as the driven friction disc 3, is in engagement with a sun gear 7' which is provided with inner teeth. The result of this is a reversal of movement of the driven friction wheel 3 as compared with the form of construction illustrated in Figs. 1 and 2. The rocker arm 5 is in this case located between the driven friction disc 3 and the pinion 4.

Now instead of the arrangement disclosed in said application of the driven friction disc 3 and the pinion 4 on the same axle, favorable coupling pressures can also be obtained with arrangements in which the driven friction wheel is coupled rigidly with the axle of the pinion swinging freely about the axle of the sun wheel, for example by means of gears. Such forms of construction are shown in Figs. 5–10. Fig. 5 shows diagrammatically that between the driven friction disc 3 and the pinion 4 swinging freely about the axle 6 of the sun gear 7, there is placed a train of gears, which, in the example shown in the drawing, consists of the intermediate gears 10 and 11. All four gears 7, 4, 10, 11 are mounted on a common rocker arm 12. In the directions of rotation shown in Fig. 5, tooth pressures Z are produced between the sun wheel 7 and the pinion 4, Z' between pinion 4 and gear 10, and Z'' between the two intermediate gears 10 and 11. All these tooth pressures are transmitted by way of the common rocker arm 12 to the axle of the driven friction disc, and act as coupling pressure P at the position of contact between the driving friction disc 2 and the driven friction disc 3.

It can be seen that Fig. 5 does not show any particularly favorable utilization of power, because the tooth pressure Z' acts in opposite direction to the tooth pressures Z and Z''. Accordingly, at the position of contact between the two friction wheels there will occur a coupling pressure P which, apart from the different lever arms at which the tooth pressures engage, result approximately from the pressures indicated by the arrows Z—Z''—Z'.

If a more favorable utilization is desired, the tooth pressures must be moved so that the unfavorable moment which results from the intermediate pressure Z' is reduced. Fig. 6 shows an arrangement by which an increased pressure P can be obtained between the driving friction disc 2 and the driven friction disc 3. The additional gears 11 and 10 are removed out from the common connecting line between the sun gear 7 and the pinion 4.

The conditions are still more favorable if this moving out is further increased. Fig. 7, for example, shows an arrangement in which all the tooth pressures Z, Z' and Z'' produce moments revolving in the same direction about the driven shaft 6, so that accordingly in this case a maximum coupling pressure P can be produced between the driving friction disc 2 and the driven friction disc 3.

While Figs. 5–7 show the arrangement of the entire train of wheels on a common rocker arm 12, Fig. 8 shows an arrangement in which the rigid coupling between the pinion 4 and the driven friction disc 3 is effected by way of a single intermediate gear 13, which is mounted on a rocker arm 14, which is adapted to swing out about the axle 15 of the pinion 4. With the directions of rotation shown in the drawings there are obtained tooth pressures Z and Z' both of which are transmitted by way of the rocker arm 14 to the axle of the driven disc 3. On this rocker arm 14 the forces Z and Z' combine to form a resultant which then yields the coupling pressure P between the driving friction disc 2 and the driven friction disc 3. In this case the coupling gear 13 can carry out, between the pinion 4 and the driven friction disc 3, a swinging movement not only about the axle 15 of the pinion 4, but also about the axle 6 of the sun gear 7. Consequently one has a completely free possibility of adjustment of the driven friction disc 3 in relation to the driving friction disc 2 and consequently also a maximum of utilization of the back-pressures from the gears for the coupling pressure P.

If the essential idea of the production of the coupling pressure P from the two back-pressures Z and Z' in the gearing according to Fig. 8 is understood, then the fully free guiding of the coupling wheel 3 may also be replaced by a positive guiding which for example is effected by the link 16 shown in Fig. 9 or by the link 16' indicated by broken lines. Each of these links swings naturally about a fixed pivot 17 or 18. It can be seen that the guiding selected renders possible a free transmission of the back pressures produced between the gears, to the point of application between the driving friction disc and the driven friction disc.

Exactly the same result is obtained, if instead of the link guides shown in Fig. 9, there are used other guides, for example the fixed guide 19 assumed in Fig. 10 for the pin 20 of the intermediate or coupling gear 13.

In all arrangements hitherto described, for the rigid coupling of the driven friction wheel with the pinion, gears were used. In a similar favorable manner it is, however, possible to insert between the pinion 4 swinging freely about the axle 6 of the sun gear 7, and the driven friction wheel 3, other friction mechanism, for example helical and worm wheels. Fig. 11 shows an arrangement in which the driven friction disc 3 is combined with a worm gear 21 on the same axle 20. With the worm gear 21 there engages the worm 22 which transmits its movement by way of bevel pinions 23 and 24 to the pinion 4. In this case, with the directions of rotation chosen, there is produced in the plane of the friction disc, a back-pressure Z between the sun gear 7 and the pinion 4, and a back pressure Y between the worm 22 and the worm gear 21. Both together give the coupling pressure P of the driven friction disc 3 with the driving friction disc 2 this time arranged outside the driven friction disc 3.

If one observes the directions of rotation shown in the figures, it will be seen that certain rules apply for the selection of the correct directions of rotation. In all cases in which the sun gear is provided with external teeth, the direction of rotation of the driven friction wheel must be chosen in the direction of shift with which, when the sun gear is held firm, the driven friction disc tends to set itself in motion. In Fig. 5, for example, a clockwise direction of rotation is assumed for the driven friction disc 3. If in this case the sun gear 7 is supposed to be held firm, the result of this movement is that the pinion 4 adjacent to the sun gear 7 tends to turn in clockwise direction on the fixed sun gear. As in the case illustrated in Fig. 5, all the axles of the gears are connected with the common rocker arm 12, when the sun gear is held fast, this shifting movement extends also to the other gears 10 and 11. The rotary shifting movement to the right thus corresponds to the right-hand rotation or the clockwise rotation of the driven friction disc. Exactly the same is true of the other forms of construction of Figs. 6–11.

If, however, the sun gear, as shown in Fig. 3, is provided with internal teeth a reversal of the shifting movement occurs. In the case of sun gears with internal teeth, the direction of rotation of the driven friction wheel must accordingly be chosen opposite to the direction of the shifting movement when the sun gear is fixed or the driving shaft is fixed, if one wishes to obtain a sufficient coupling pressure and therefore good operation of the gearing.

I claim as my invention:

1. Friction gearing comprising a driven friction wheel, a friction disc associated with the friction wheel, a sun gear mounted on an axle, a pinion being in engagement with the sun gear, means including an intermeshing drive adapted to effect a positive connection between said driven friction wheel and the pinion, the axis of rotation of the sun gear, pinion and the intermeshing drive being out of alignment relative to each other, and a rocker arm mounted to rotate on the axle of the sun gear and carrying the pinion and said means so that the back pressure between the teeth of the sun gear and the pinion and the back pressures of the means connecting the driven friction wheel to the pinion will create the coupling pressure between the friction wheel and the friction disc.

2. Friction gearing according to claim 1, in which the resultant back pressure of the means connecting the driven friction wheel to the pinion augment the back pressure between the teeth of the sun gear and the pinion.

3. Friction gearing according to claim 1, in which the sun gear has external teeth and when said sun gear is held against rotation the rocker arm tends to increase the contact pressure between the friction wheel and disc.

4. A friction gearing according to claim 1, in which the rocker arm is composed of two arms angularly connected to each other.

5. A friction gearing according to claim 1, in which the rocker arm is composed of two arms angularly connected to each other and said toothed gear being rotatably mounted on one end of one arm and the sun gear being rotatably mounted on one end of the other arm, the pinion being rotatably mounted on both the other ends of both of said arms.

6. A friction gearing according to claim 1, in which the rocker arm is composed of two arms angularly connected to each other, and in which guiding means are provided arranged in such a manner that they permit the transmission of the back pressures cumulatively to the friction disc at the point of contact between the friction wheel and the friction disc.

HERMANN KÖHL.